(12) United States Patent
Farah et al.

(10) Patent No.: US 8,461,483 B2
(45) Date of Patent: Jun. 11, 2013

(54) ENGINE DRIVEN WELDING POWER SUPPLIES WITH TWO PIECE SHAFT

(75) Inventors: Samir F. Farah, Broadview Heights, OH (US); David Joseph Bender, Chardon, OH (US); Edward A. Enyedy, Eastlake, OH (US); Carmen J. Delisio, Mentor, OH (US)

(73) Assignee: Lincoln Global, Inc., City of Industry, CA (US)

( * ) Notice: Subject to any disclaimer, the term of this patent is extended or adjusted under 35 U.S.C. 154(b) by 292 days.

(21) Appl. No.: 12/841,282

(22) Filed: Jul. 22, 2010

(65) Prior Publication Data

US 2011/0017717 A1   Jan. 27, 2011

Related U.S. Application Data

(60) Provisional application No. 61/274,098, filed on Jul. 24, 2009.

(51) Int. Cl.
*B23K 9/10* (2006.01)
*B23K 7/11* (2006.01)

(52) U.S. Cl.
USPC .................. 219/130.1; 219/133; 219/134

(58) Field of Classification Search
USPC ...................... 219/130.1, 133, 134
See application file for complete search history.

(56) References Cited

U.S. PATENT DOCUMENTS

| | | |
|---|---|---|
| 3,098,191 A | 7/1963 | Cavert et al. |
| 3,681,564 A | 8/1972 | Hiyama et al. |
| 3,767,880 A | 10/1973 | Austin |
| 4,572,944 A | 2/1986 | Ballard |
| 4,665,300 A | 5/1987 | Bellefleur |
| 5,055,644 A | 10/1991 | Alsch |
| 5,183,993 A | 2/1993 | Sato et al. |
| 5,857,915 A | 1/1999 | Leith |
| 5,982,061 A | 11/1999 | Grantz et al. |

(Continued)

FOREIGN PATENT DOCUMENTS

| | | |
|---|---|---|
| EP | 173874 | 2/1989 |
| EP | 1459832 | 9/2004 |
| EP | 910102 | 11/2005 |
| GB | 735544 | 8/1955 |

OTHER PUBLICATIONS

Partial International Search Report from PCT/IB2010/001825 dated Dec. 1, 2010.

(Continued)

*Primary Examiner* — Trong Phan
(74) *Attorney, Agent, or Firm* — Calfee, Halter & Griswold LLP

(57) ABSTRACT

An engine driven welding system includes two power generators, each having a rotor and a stator. Each rotor is mounted on a respective drive shaft, with one of the drive shafts being driven by the engine and the other drive shaft being releasably coupled to the engine driven drive shaft. This provides a modular type construction of the welding system, in that the outboard power generator can be selected or changed as needed for a particular application. The coupled drive shafts are supported by two bearing assemblies. Also disclosed as additional features for any welding system power supply is a removable plate having one or more connectors releasably attached thereto for facilitating installation of an electrical component for a welding system power supply; and also a power switch having a member that restricts rotational movement of the switch.

16 Claims, 9 Drawing Sheets

U.S. PATENT DOCUMENTS

| | | | |
|---|---|---|---|
| 6,051,809 A | 4/2000 | Colella | |
| 6,124,567 A * | 9/2000 | Feldhausen et al. | 219/130.1 |
| 6,469,401 B2 | 10/2002 | Beeson et al. | |
| 6,491,602 B1 | 12/2002 | Hohn | |
| 6,610,947 B2 | 8/2003 | Campana et al. | |
| 6,969,334 B2 | 11/2005 | Schleuder et al. | |
| 7,312,419 B2 * | 12/2007 | Beeson et al. | 219/133 |
| 8,080,761 B2 * | 12/2011 | Matthews et al. | 219/130.1 |
| 2002/0158056 A1 | 10/2002 | Ho | |
| 2003/0230475 A1 | 12/2003 | Koide et al. | |
| 2006/0035746 A1 | 2/2006 | Griggs et al. | |

OTHER PUBLICATIONS

International Search Report and Written Opinion from PCT/IB10/01825 dated Mar. 11, 2011.

* cited by examiner

ENGINE DRIVEN WELDING POWER SUPPLIES WITH TWO PIECE SHAFT

CROSS-REFERENCE TO RELATED APPLICATION

This application claims the benefit of U.S. provisional patent application Ser. No. 61/274,098, entitled ENGINE DRIVEN WELDING POWER SUPPLIES WITH TWO PIECE SHAFT and filed Jul. 24, 2009, the entire disclosure of which is fully incorporated herein by reference.

TECHNICAL FIELD OF THE INVENTIONS

The present disclosure relates to engine driven welding systems. More particularly, the disclosure relates to engine driven welding systems having at least two power generators associated with the engine. Some aspects of the disclosure relate to welding systems in general, not just engine driven welding systems.

BACKGROUND OF THE DISCLOSURE

Engine driven welding systems may include two power generators, for example, a weld power generator and an auxiliary power generator. In prior systems, these power generators have been mounted on a common single-piece shaft driven by the engine. This makes build, modification and repair costly and time consuming.

In some welding systems, it may be desired to install optional equipment on the power supply. In prior systems, it is difficult and time consuming to identify and access the one or more wires needed to connect to the equipment.

Still further, prior welding systems that provide for multiple power outputs use a switch for selecting an output from the power supply. But since power supplies can vary as to the number of selectable outputs, it is necessary to maintain inventory of different switches and reactors.

SUMMARY OF THE DISCLOSURE

In accordance with an embodiment of one of the inventions presented in this disclosure, an engine driven welding system includes two power generators, each having a rotor and a stator. Each rotor is mounted on a respective drive shaft, with one of the drive shafts being driven by the engine and the other drive shaft being releasably coupled to the engine driven drive shaft. This provides a modular type construction of the welding system, in that the outboard power generator can be selected or changed as needed for a particular application. In another embodiment, the coupled drive shafts are supported by two bearing assemblies, with one bearing assembly near an end portion of the one drive shaft and the other bearing assembly near the outboard end of the second drive shaft.

In accordance with an embodiment of another one of the inventions presented in this disclosure, an exterior panel that supports electrical components and/or hardware for a power supply of a welding system includes a removable plate or cover. The plate may be removed, for example, to allow an electrical component, for example a meter, to be installed in the mounting location in place of the removed plate. The plate includes one or more conductors or connectors that are attached to the plate, so that when the plate is removed an operator may easily grasp the attached one or more conductors, remove the one or more conductors from the plate and connect them to the electrical component being installed.

In accordance with an embodiment of another one of the inventions presented in this disclosure, a power switch mechanism for a welding system power supply includes a rotary power switch having N selectable positions that correspond to different outputs from the power supply where N is an integer with $N \geq 2$, and a member associated with the rotary power switch to restrict rotation of the switch to a lesser number of selectable positions. For example, the member may be used to restrict rotation of the rotary power switch to $N-1$ selectable positions. In a more specific embodiment, the member comprises a plate that is mounted to the rotary power switch and interferes with rotational of at least one of the switch contacts. In another embodiment, the switch contact may be and unused contact, or a non-energized contact when the contact interferes with the member.

These and other aspects, embodiments and advantages of the inventions disclosed herein will be understood by those skilled in the art from the following detailed description of the exemplary embodiments in view of the accompanying drawings.

DESCRIPTION OF THE EXEMPLARY EMBODIMENTS

Figure 1:
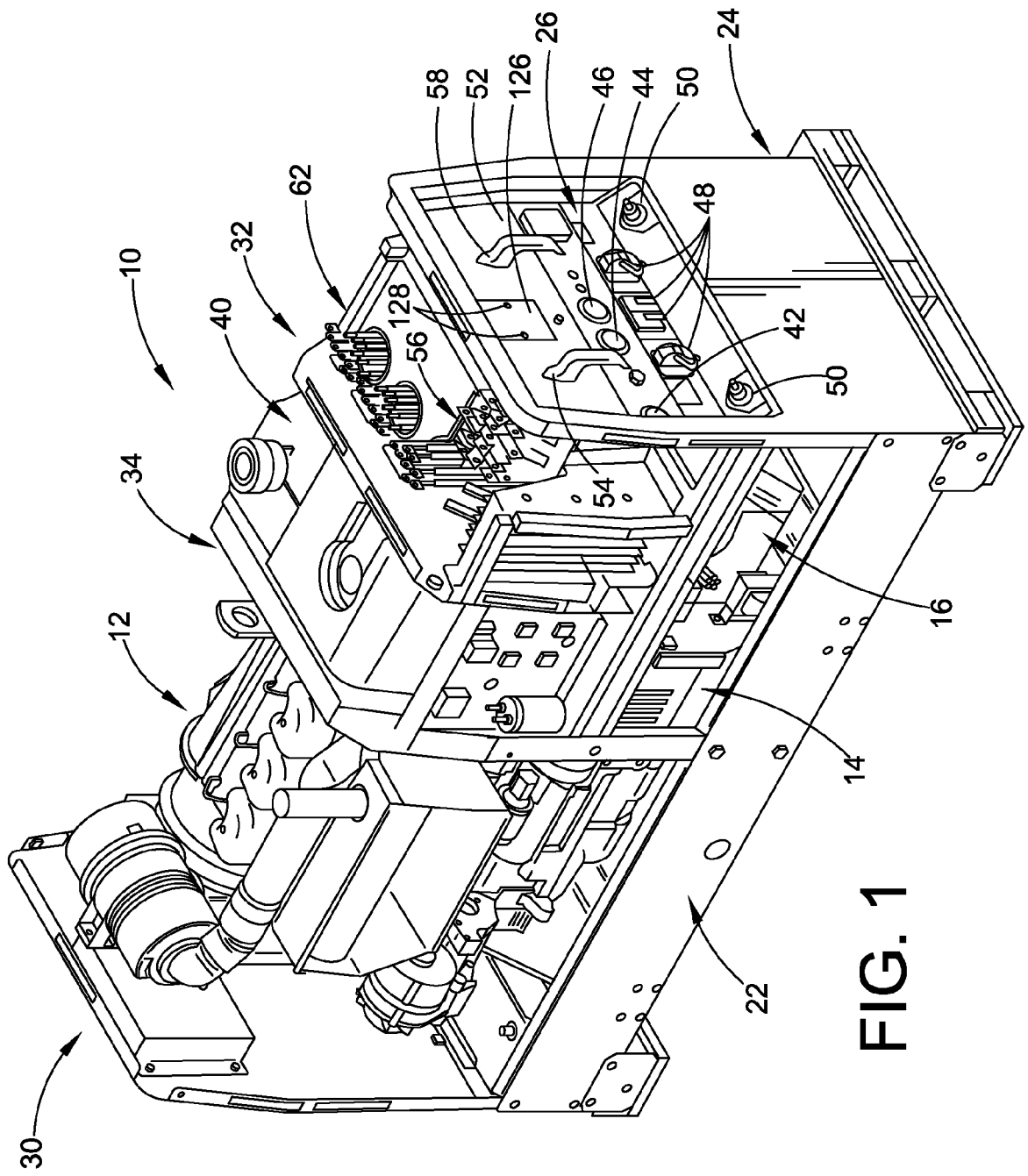
FIG. 1 is a perspective of an exemplary engine driven welding system that may be used with one or more of the inventions presented herein.

While the various inventions and inventive concepts are described herein with reference to specific embodiments, such illustrations and descriptions are intended to be exemplary in nature and not as the only embodiments. For example, an embodiment of an engine driven welding system is illustrated with specific examples of power generators, however, the particular design of the welding system and the power generators is largely a matter of design choice except as to various inventive concepts presented herein. Also, as to the inventive concepts concerning a removable plate and a rotatable power switch, such inventions will find application in many different welding systems whether engine driven or otherwise.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

Figure 2:
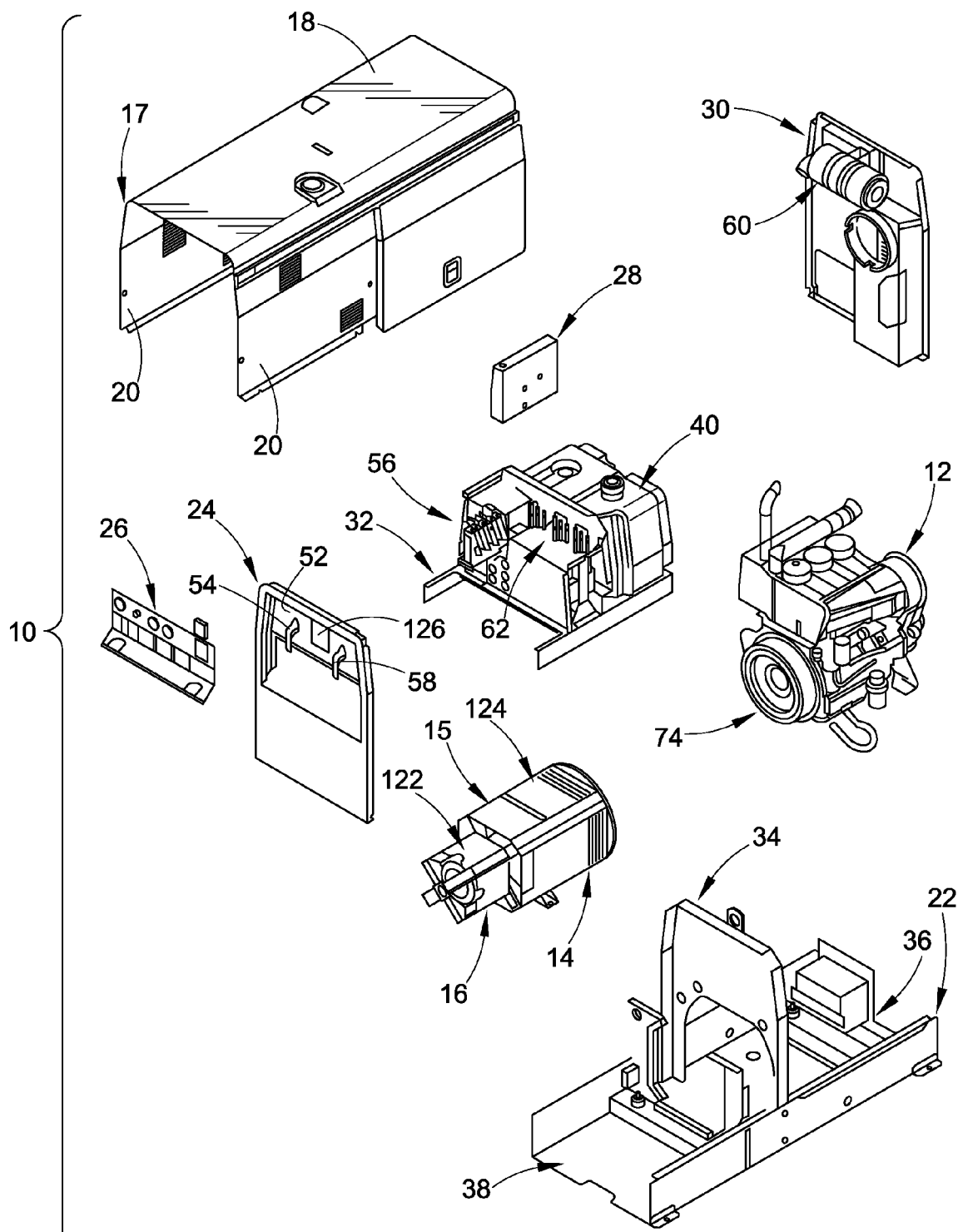
FIG. 2 is a breakout illustration of the various major subassemblies that are part of the welding system of FIG. 1.

With reference to FIGS. 1 and 2, an exemplary engine driven welding system 10 is illustrated, and such a welding system 10 may incorporate any one or more or all of the inventions described herein. The specifics of the overall welding system 10, including the engine 12 and power generators 14, 16 (the latter not fully visible in the view of FIG. 1) are not restrictive as to the nature and use of the inventions presented herein. Rather, many different types of engines, including diesel and gas powered of various sizes and designs, and many different power generators, may be used as a welding system suitable for use with the inventions herein. Moreover, some of the inventions herein will find application outside of the art of engine driven welding systems to welding system power supplies in general.

A covers assembly 17 may include a roof 18 and various side casings 20 (FIG. 2), typically made of sheet metal, and is omitted from FIG. 1 to illustrate the overall assembly of the engine driven welding system 10. The major subassemblies may include a support base 22, the engine 12, a generator assembly 15 that includes in this example two power generators 14, 16, a case front and upper control panel assembly 24, a lower control panel 26, an inner control panel 28, a case back assembly 30 and a reactor, rectifier and fuel tank assembly 32. The support base 22 may include a lift frame 34.

The engine 12 may be mounted in a rearward portion 36 of the support base 22, and the generator assembly 15 may be mounted in a forward portion 38 of the support base 22. The reactor, rectifier and fuel tank assembly 32 may be mounted generally above the generator assembly 15, and supported by the lift frame 34 and the case front 24. This positions the fuel tank 40 in a convenient location for the user. The generator assembly 15 is generally aligned with the drive mechanism of the engine 12 as will be more apparent from the below discussion.

The lower control panel assembly 26 may include various components that facilitate the use and control of the welding system 10, for example, a fuel/hour gage 42, oil temperature and pressure gages 44, 46 and various electrical receptacles 48, and output terminals 50. An upper control panel 52 may include various control handles for manual actuation, for example, a first control handle 54 that may be used to select the output from the welder power supply (the welder power supply produces one or more current/voltage power outputs based on the power generated by the welder power generator). The first control handle 54 in this example is used to manually rotate a rotary power switch 56 that is mounted on the reactor, rectifier and fuel tank assembly 32 (the reactor and rectifier assembly are major components of the welding power supply). A second control handle 58 may be used, for example, to operate a rotary rheostat (not shown) mounted on the interior side of the case front 24 opposite the second control handle 58. The case back 30 may support, for example, an air cleaner 60 for the engine 12.

Various electrical cables 62 (illustrated in a non-connected condition) are used to connect the three phase weld stator windings to the reactor (not shown in detail in FIG. 2) via the rotary power switch 56. In this exemplary embodiment, the weld power generator produces a three phase output with various taps so that different outputs can be selected using the rotary power switch 56 (for example, different voltage and current outputs). Many different weld power generators may be used beyond three phase, and also may provide different numbers of taps for different output options.

In the exemplary embodiments herein, two power generators 14, 16 are used. The first power generator 14 may be, for example, a weld generator, and the second power generator 16 may be an auxiliary power generator such as may be used for auxiliary power tools and so on. However, the inventions herein may be used with welding systems that provide two weld power generators, two auxiliary generators and so on.

Figure 3:
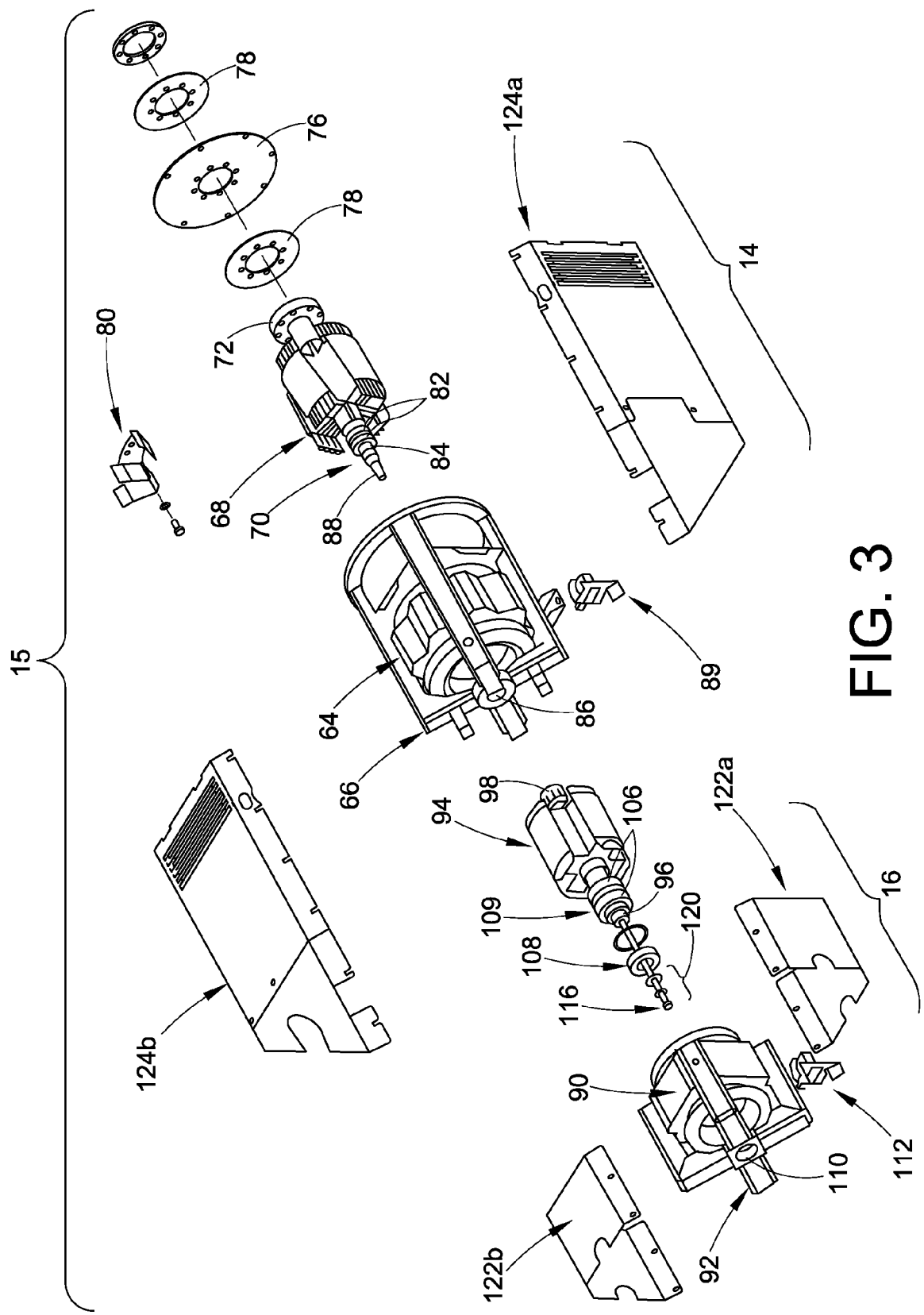
FIG. 3 is an exploded view of the generator assembly of FIG. 2 herein.
Figure 4:
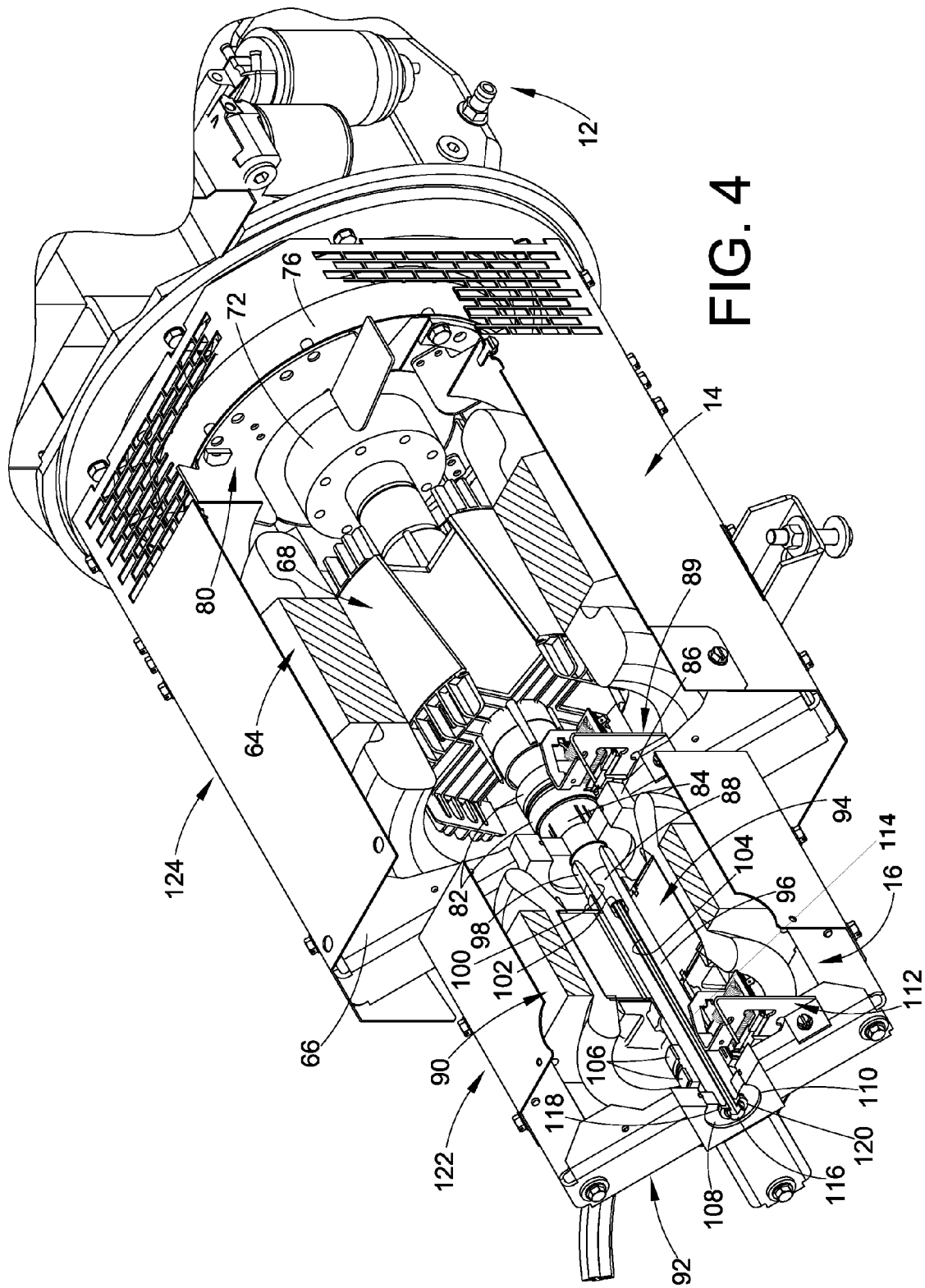
FIG. 4 is a partial cutaway of the assembled generator assembly of FIG. 3 as also coupled to the engine (partially shown)

FIGS. 3 and 4 illustrate in more detail the exemplary power generator assembly 15 and an embodiment of one of the inventions herein. The overall operation of the first and second power generators 14, 16 are well known and need not be described herein, beyond stating that any suitable generator designs may be used, whether known or later developed. The first power generator 14 may include a stator 64 that is supported on a welded tie bar assembly 66. The first power generator 14 also includes a rotor 68 having a first drive shaft 70 extending centrally there through. A first or back end of the first drive shaft 70 may include a coupling flange 72 that is mounted to the flywheel 74 (see FIG. 2) of the engine 12 using a coupling disc 76 and two backing plates 78. The engine 12 is only partly shown in FIG. 4. In this manner, the engine 12 rotates the first drive shaft 70 and with it, the rotor 68 of the first power generator 14. A blower paddle assembly 80 may be mounted on the coupling disc 76 to provide cooling air for the power generators.

The rotor 68 of the first power generator 14 further includes two brush rings 82 for electrical contact to the rotor windings, and a first bearing 84, all mounted on a second end 88 or outboard portion of the first drive shaft 70. The first bearing 84 journals into a first bearing support 86 that may be provided with the tie bar assembly 66. The first drive shaft 70 is thus fully supported at each first and second end by the engine flywheel mounting and the first bearing 84 respectively. The first bearing 84 may be any suitable shaft bearing as are well known in the art.

The outboard end portion 88 of the first drive shaft 70 extends axially beyond the tie bar assembly 66 and is releasably connected with a second drive shaft, as will be described herein shortly. A first brush holder assembly 89 is also provided for contact with the brush rings 82.

The second power generator 16 may include a stator 90 that is supported on a second welded tie bar assembly 92. The second power generator 16 also includes a rotor 94 having a second drive shaft 96 extending centrally there through. The back end 98 of the second drive shaft 96 includes an axially tapered bore 100 (see FIG. 4). This axially tapered bore 100 slideably receives the outboard end portion 88 of the first drive shaft 70. From FIGS. 3 and 4 it will be noted that the outboard end 88 of the first drive shaft 70 is also axially tapered in a complementary fashion with the tapered bore 100 of the second drive shaft 96. The first and second drive shafts 70, 96 are thus mechanically coupled together with this tapered coupling.

The first drive shaft 70 also includes an internally threaded bore 102 (FIG. 4). The second drive shaft 96 includes an internal through bore 104. The rotor 94 of the second power generator 16 further includes two brush rings 106 for electrical contact to the rotor windings, and a second bearing 108, all mounted on the second drive shaft 96. The second bearing 108 journals into a second bearing support 110 that may be provided with the second tie bar assembly 92. The second drive shaft 96 is thus fully supported at one end (98) by the first drive shaft second end 88 and the first bearing 84, and at an opposite end by the second bearing 108. The second bearing 84 may be any suitable shaft bearing as are well known in the art.

A second brush holder assembly 112 is also provided for contact with the second power generator brush rings 106.

A threaded bolt 114 extends through the second drive shaft interior bore 104 and into the internally threaded bore 102 of the first drive shaft 70. The bolt 114 mechanically joins the first and second drive shafts 70, 96 together, and has a hex cap 116 that bears against the distal end 118 of the second drive shaft 96. Note that the distal end 118 axially extends slightly beyond the outer facing surface of the second bearing 108. A centering and lock washer assembly 120 may be used to secure the threaded bolt 114. The second power generator 16 may include a cowling 122 having for example a first and second section 122a, 122b. Similarly, the first power generator 14 may include a cowling 124 having first and second sections 124a, 124b.

Accordingly, the welding system 10 provides for two power generators 14, 16 driven by an engine, with the second power generator 16 supported on its own drive shaft 96 that is releasably coupled to the first drive shaft 70 of the first power generator 14. This provides a modular construction in which the second power generator can be built, maintained or replaced without having to tear down the entire first power generator mounting. The use of the two bearings 84, 108 provides excellent support for the drive shafts 70, 96.

Although a tapered coupling is used between the two drive shafts, such is not required. Any suitable coupling may be used, it being preferred that the coupling be releasable so that the second power generator may be easily removed without having to disassemble the first generator mounting arrangement. For example, other couplings may include but are not limited to a rubber coupling, bolted plates, a spline coupling, or a lovejoy-type coupling to name a few examples.

Figure 5:
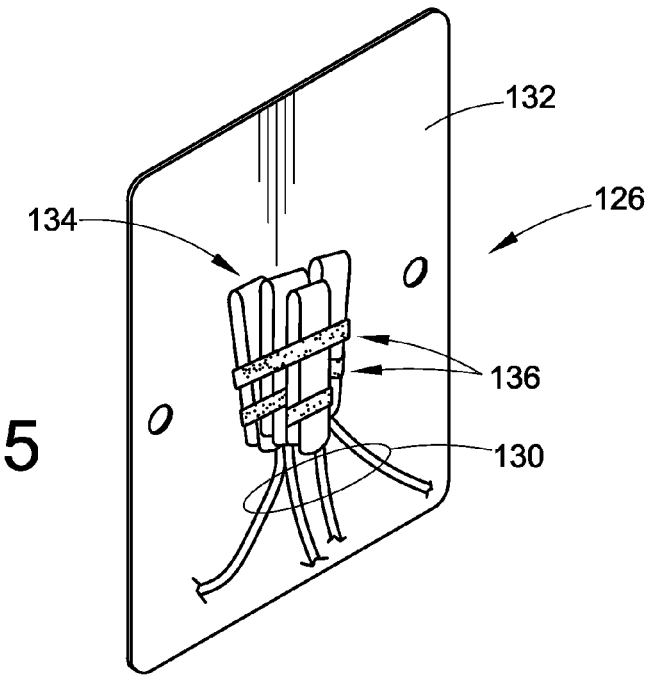
FIG. 5 is an enlarged view of the backside of a cover or plate used on the front control panel of the welding system of FIG. 1.

With reference again to FIG. 1 and also FIG. 5, oftentimes it is desirable to provide users with the option of adding on various components which were not part of the original build. For example, a customer may wish to add various meters, gauges, timers or other instruments to the welding system 10 or any other welding system for that matter. To accommodate such possible modifications, the covers assembly 17 or other convenient support structure or exterior panel may be provided with one or more removable covers or plates 126. Although in the exemplary embodiments herein the plate 126 is shown in the upper control panel 52, such is not required and the plate or plates 126 may be located at any convenient location, although typically will be part of the covers assembly 17. The plate 126 may be easily removable by using one or more attachment members 128 such as screws.

When an electrical component or instrument is to be installed in place of the plate 126, it is necessary to locate and connect the appropriate wires to the device. In the past this has required the installer to identify and locate the appropriate wires within the welding system 10 interior. The wires then have to be manually routed to the opening provided for the instrument or electrical component after the plate 126 has been removed. In accordance with one embodiment of another inventive concept disclosed herein, the connecting wires 130 may be attached to the backside or interior surface 132 of the plate 126, for example during build of the welding system 10. The ends of the wires may be optionally covered by a protective material 134 such as tape. Any suitable means may be used to attach the wires 130 to the plate interior surface 132, for example, a cable tie 136, VELCRO™, simple tape and so on to name just a few example. The attachment technique should be secure enough that the wires will not fall off the plate 132, but can be removed from the plate after the plate 126 has been removed from the supporting panel it is installed on, such as the upper control panel 52. In this manner, when the plate 126 is removed, the wires 130 are carried with the plate 132 so that the wires 130 are immediately accessible to the person installing the electrical component. The person installing the equipment can easily remove the wires 130 from the plate 126 and connect them to the electrical component being installed, without having to identify and fish around inside the welding system 10 interior for the correct wires. The wires may be connected to the electrical component either before or after the component is installed in the opening or mounting location from which the plate 126 was removed.

Figure 6:
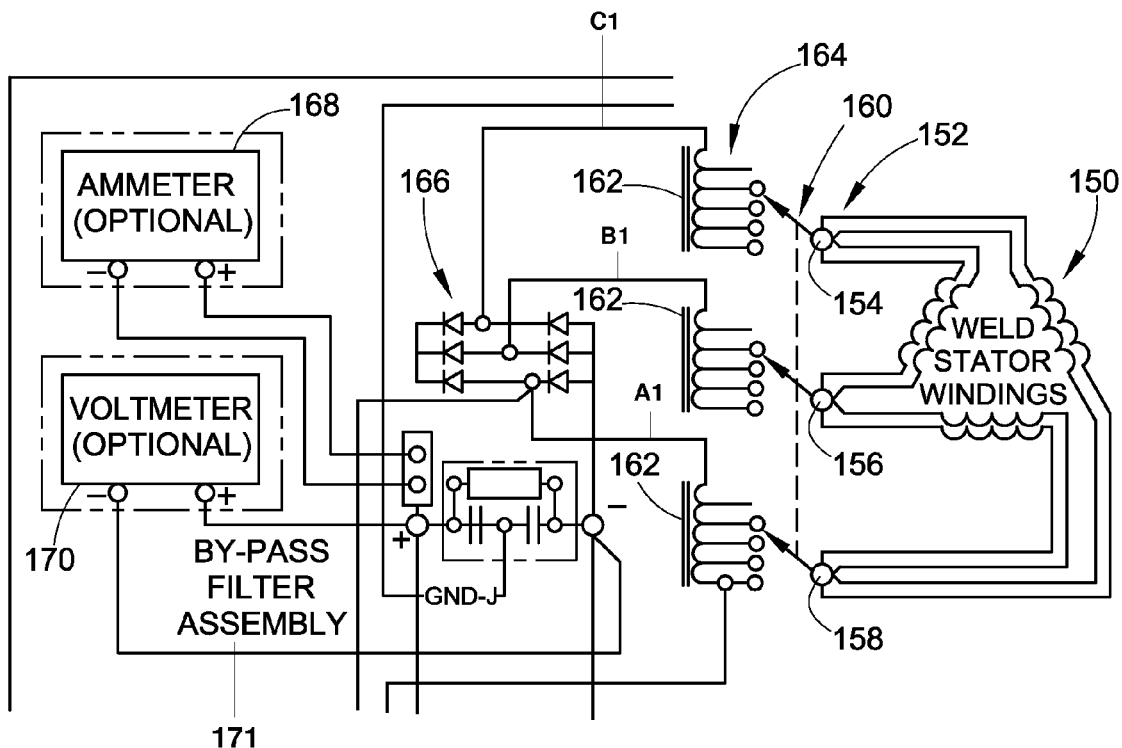
FIG. 6 is a typical wiring diagram of a selector switch circuit portion of a welding system control circuit.
Figure 7:
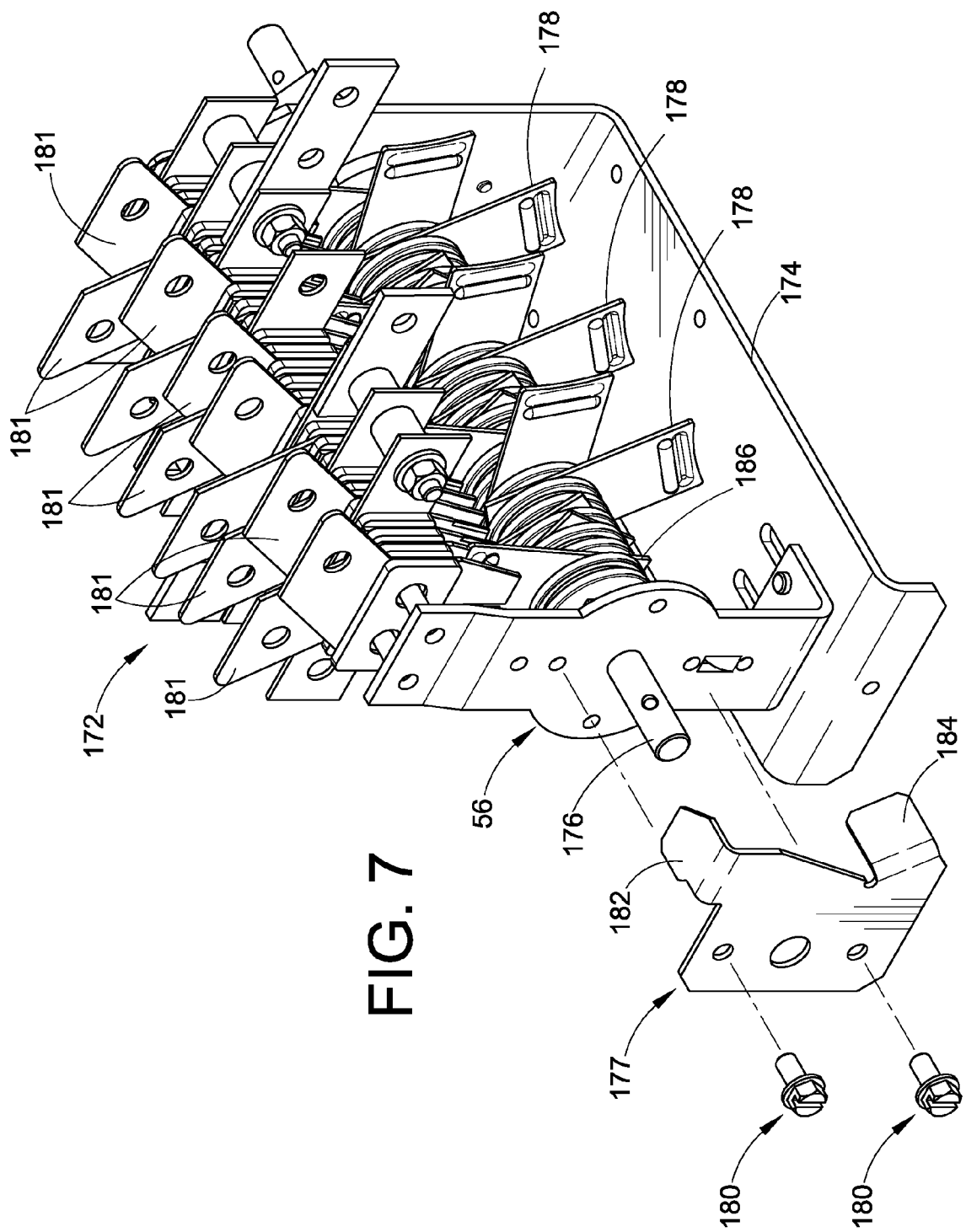
FIG. 7 is a partially exploded perspective of a rotary power switch that may be used with the welding system of FIG. 1, or other welding system.
Figure 8:
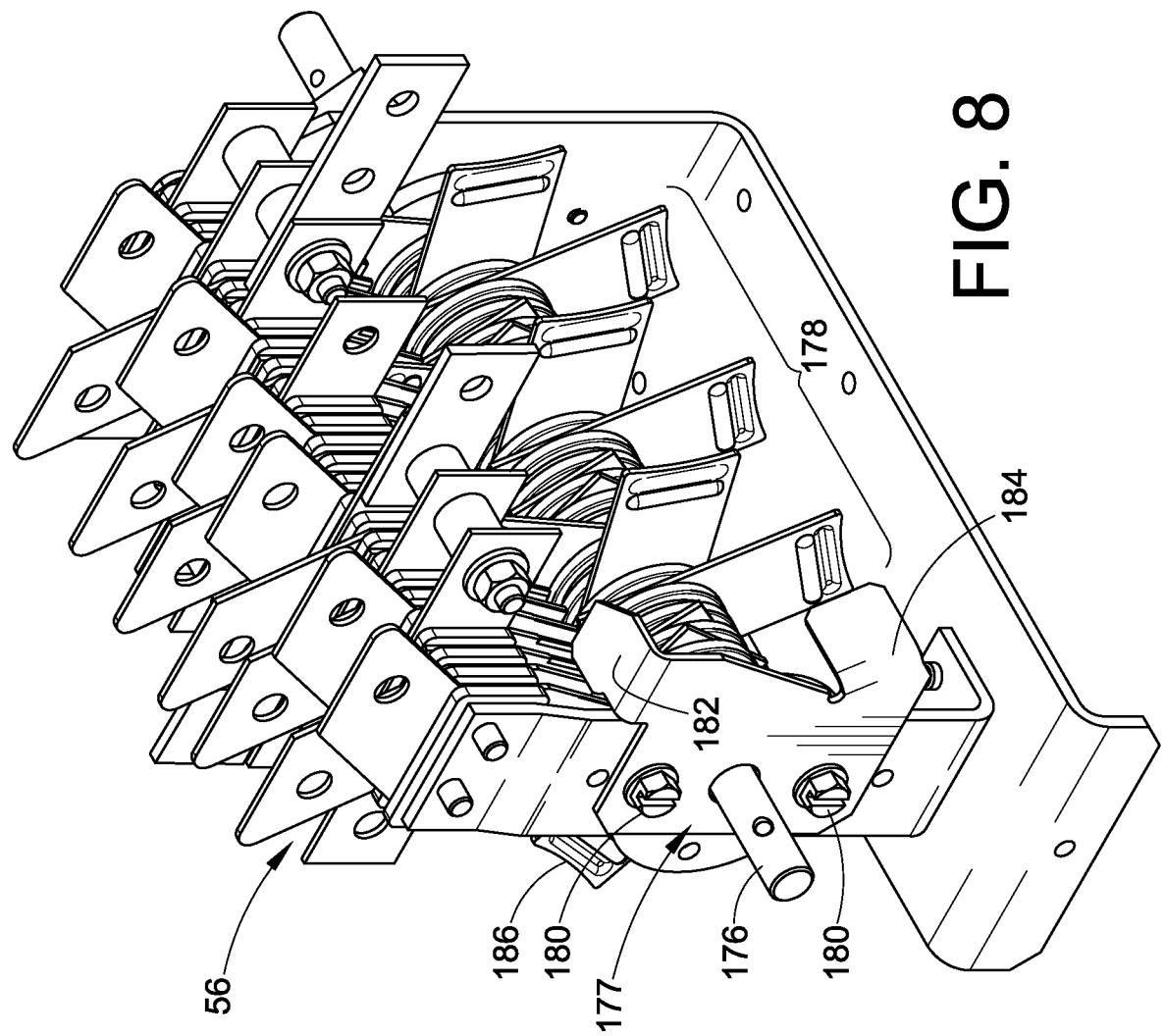
FIG. 8 is an assembled perspective of the rotary power switch of FIG. 7.

With reference to FIGS. 7 and 8, we illustrate an embodiment of another one of our inventive concepts. Power generators used for welding systems often produce a number of different selectable outputs, for example, with different voltage and current ranges. This is often done with using a plurality of taps off of the stator windings, as is known. FIG. 6 illustrates a typical wiring diagram for a stator output. The stator 150 in this embodiment produces a three phase output 152 at teiininals 154, 156 and 158. A selector switch function 160 may be used to connect the stator output 152 to a reactor or multi-tap transformer device 162. The reactor 162 produces selectable three phase outputs at A1, B1 and C1 depending on which taps 164 the operator connects the stator output 152 to using the selector switch function 160. The reactor 162 output (A1, B1, C1) is input to a conventional rectifier circuit 166 to produce the desired or selected output. Note FIG. 6 also illustrates optional meters, such as an ammeter 168 or voltmeter 170, such as are typical electrical components that may be installed at the plate 126 location, for example, and a by-pass filter assembly 171.

FIG. 7 illustrates an embodiment of a selector switch 172 for carrying out the selector switch function 160 of FIG. 6. In this example, the selector switch 172 may be realized in the form of a commercially available rotary power switch 56. Other suitable rotary power switches may alternatively be used. The rotary power switch 56 includes a support bracket 174 that may be used to mount the switch 172 at an appropriate location in the welding system 10. In this embodiment, the rotary power switch 56 is mounted on the reactor, rectifier and fuel tank assembly 32 just behind the upper control panel 52 (see FIGS. 1 and 2). In this manner, the rotary power switch 56 is nearby the reactor 164 and stator 150 outputs to which it is connected via the electrical cables 62.

The rotary power switch 56 includes an actuator shaft 176 that is axially aligned with and connected to the first control handle 54 on the upper control panel 52 (see FIGS. 1 and 2). In this manner, an operator may turn the actuator shaft 176 via the handle 54 to one of a plurality of discreet selectable positions to select an appropriate output for a desired welding operation. The rotary power switch 56 includes a plurality of N rotary contacts 178—wherein N is an integer with N≧2—and a corresponding plurality of stationary contact sets 181. Each pair of stationary contact sets 181 are "hot" in that one contact of each set 181 is electrically connected to a stator output, and the other contact of each set 181 is electrically connected to one of the taps of the reactor 164. The selected tap is electrically connected to the stator when the corresponding rotary contact 178 makes a connection between the two. Thus a rotary contact is only conducting current when it makes an electrical connection between the corresponding two stationary contacts when the handle 54 is turned to the selected position for the desired corresponding output. In a typical rotary power switch 56, the control handle 54 can usually be turned fully through 360° between the various discreet positions of the switch 56.

It may be desirable in some cases to prevent one or more of the switch 56 positions from being used, for example if a particular output from the generator is not to be made available. In the exemplary embodiment, we provide a mechanism by which one less selectable positions is made available, however, based on the teachings herein one will readily appreciate that more than one position may be rendered unavailable.

Figure 9:
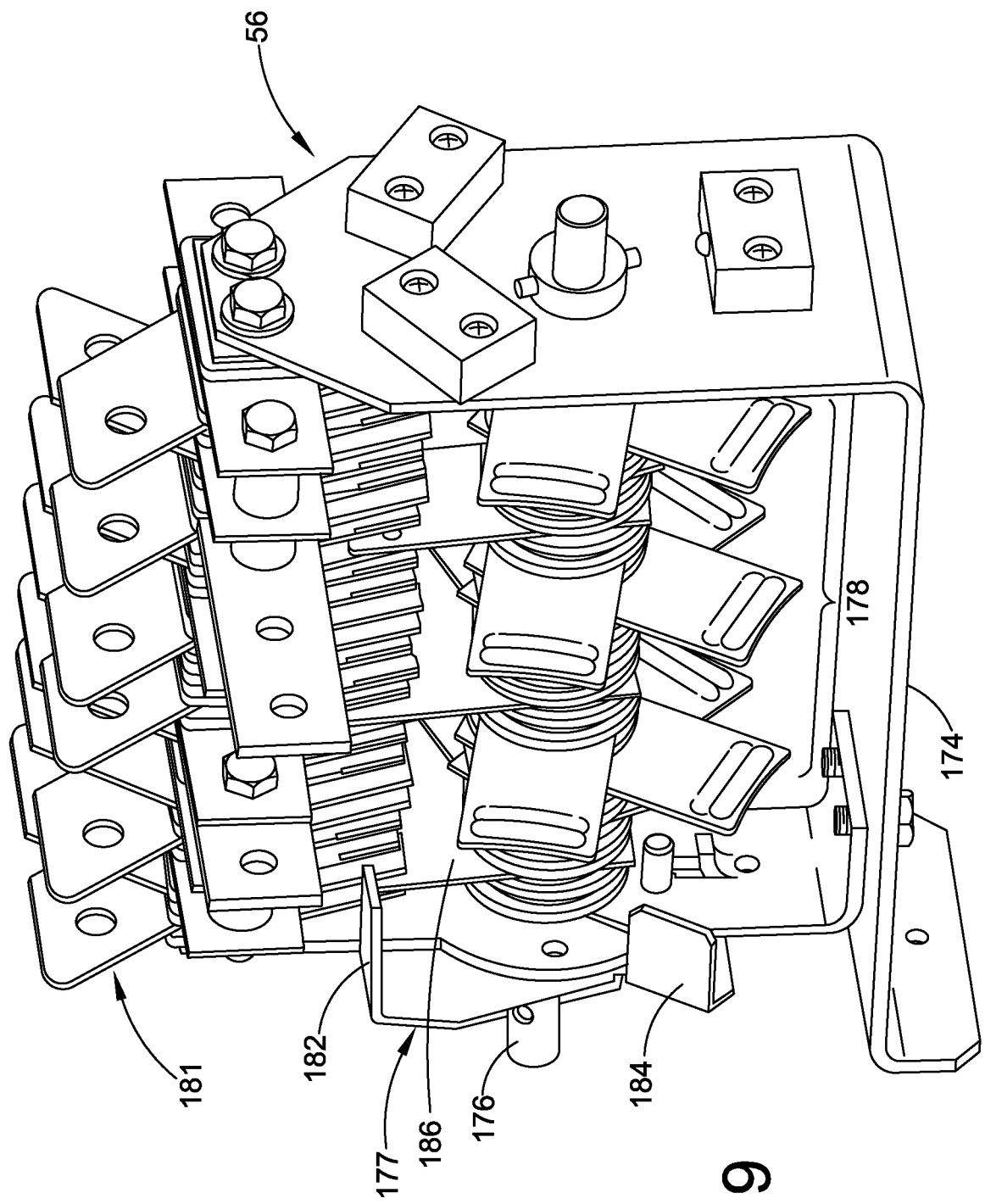
FIG. 9 illustrates the rotary power switch of FIG. 8 in a first position, viewed in perspective from an opposite end of the switch from FIG. 8.
Figure 10:
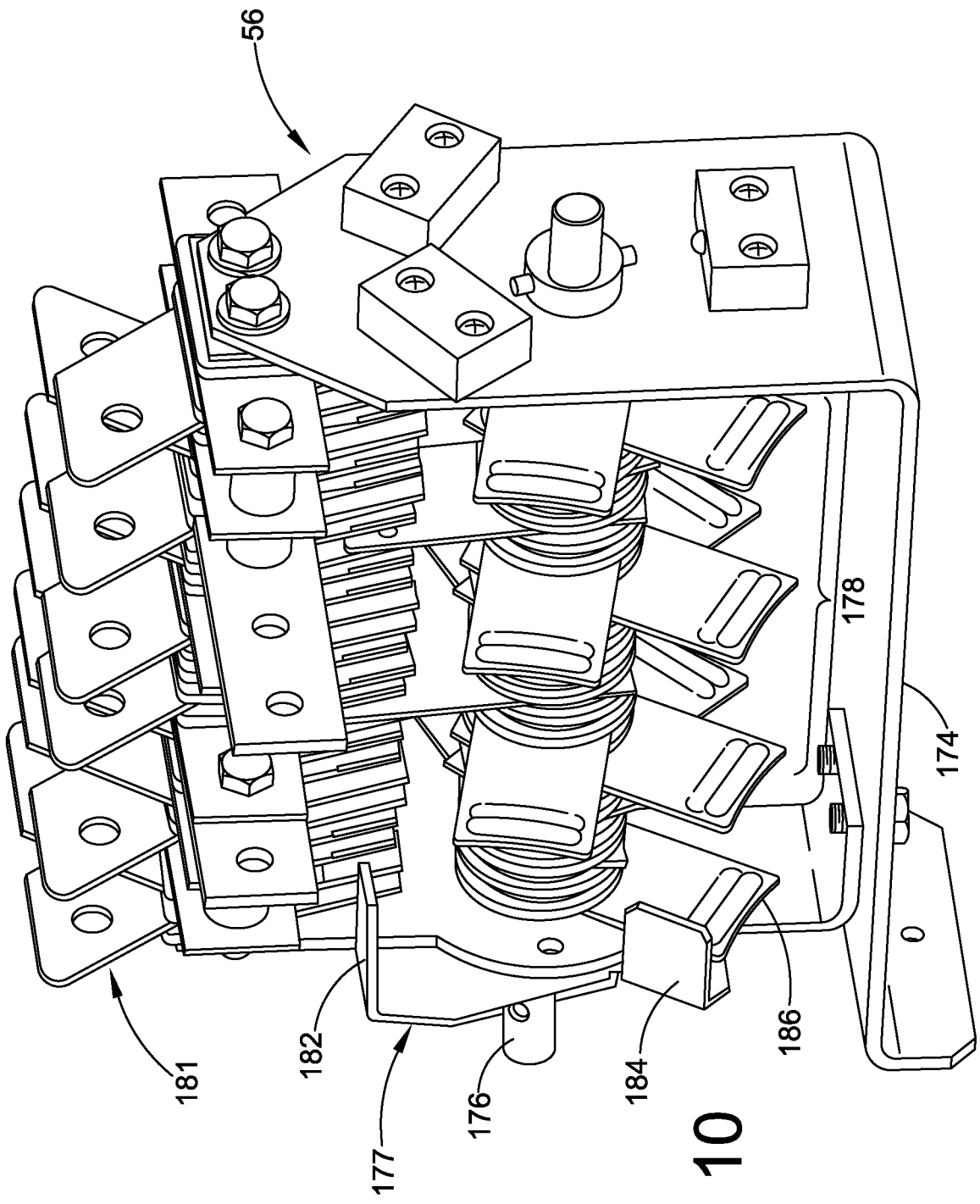
FIG. 10 illustrates the rotary power switch of FIG. 8 in a second position, viewed in perspective from an opposite end of the switch from FIG. 8.

To provide this capability, we provide an optional additional member 177 which functions as a switch stop. The switch stop 177 may be realized in the form of a plate that can be mounted to the switch support bracket 174 using screws 180 or other suitable means. In this embodiment, the switch stop 177 includes two radially offset flanges 182, 184. When installed as illustrated in FIG. 8, the flanges 182, 184 axially extend toward the rotational contacts 178, and in this embodiment, toward the closest rotational contact 186. With reference to FIGS. 9 and 10, the flanges 182, 184 will interfere and block rotational movement of the rotatable contact 186 so as to prevent the operator from selecting one of the otherwise selectable positions of the switch 56. This limits the rotary power switch 56 to N−1 selectable positions, in this embodiment. Which position is restricted may be selected by appropriate alignment and orientation of the flanges 182, 184. In the example of FIG. 9, the upper flange 182 blocks clockwise rotation of the contact 186 at a particular rotational position of the switch 56. In FIG. 10 it will be noted that the lower flange 184 blocks the counter-clockwise rotation of the contact 186 at the same rotational position of the switch 56.

In the embodiment of FIGS. 7-10, we have chosen an unused rotational contact 186 for interfering with the flanges 182, 184, meaning that the contact 186 is never "hot" or conducting current in any of the selectable positions. Alternatively, a contact that does become "hot" in one or more of the selectable positions may still be used for interfering with the switch stop 177, provided that the contact is not "hot" anytime that it contacts the switch stop flanges 182 or 184.

In this manner of the exemplary embodiment, an operator will not be able to turn the control handle 54 to one of the otherwise selectable switch 56 positions. The switch stop 177 thus may be used as an optional feature and easily removed and installed as needed. This allows, for example, a single reactor 164 design and switch 56 to be used for a particular generator, when it may be desired to make less than all the generator outputs available to an operator. This reduces the need for multiple reactor and switch inventories to accommodate such changes.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. Welding system, comprising:
an engine,
a first drive shaft and a second drive shaft,
a first power generator and a second power generator,
said first power generator comprising a first rotor disposed on the first drive shaft, the second power generator comprising a second rotor disposed on the second drive shaft,
the first drive shaft having a first end driven by the engine and a second end supported by a first bearing,
the second drive shaft having one end releasably coupled to the second end of the first drive shaft, the second drive shaft having an opposite end supported by a second bearing.

2. The welding system of claim 1 wherein the second power generator can be removed without having to uncouple the first power generator from the engine.

3. The welding system of claim 1 wherein the second power generator can be removed without removing the first bearing.

4. The welding system of claim 1 wherein the first power generator comprises a welding power generator.

5. The welding system of claim 1 wherein one of the power generators comprises an auxiliary power generator.

6. The welding system of claim 1 wherein an outboard end of the first drive shaft is releasably coupled to a back end of the second drive shaft.

7. The welding system of claim 1 wherein the first and second drive shafts are releasably coupled by complementary tapered ends of the first and second drive shafts.

8. The welding system of claim 7 wherein the first and second drive shafts are held together by a threaded bolt accessible from an outboard end of the second shaft.

9. The welding system of claim 1, wherein the second drive shaft is releasably coupled to the second end of the first drive shaft at a location spaced apart from the first bearing.

10. The welding system of claim 1, wherein the second end of the first drive shaft extends into a bore in the second drive shaft.

11. The welding system of claim 1, wherein the second drive shaft is releasably coupled to the first drive shaft by a bolt assembled through aligned internally threaded bores of the first and second drive shafts.

12. The welding system of claim 11, wherein the bolt extends beyond an outer facing surface of the second bearing.

13. The welding system of claim 11, wherein the second power generator is disposed within a housing, the bolt being accessible from outside the housing for separation of the second drive shaft from the first drive shaft without removal of the housing.

14. The welding system of claim 11, wherein the second drive shaft is spaced apart from the first bearing.

15. Welding system, comprising:
   an engine,
   a first drive shaft and a second drive shaft,
   a first power generator and a second power generator,
   said first power generator comprising a first rotor disposed on the first drive shaft coupled to the engine, the second power generator comprising a second rotor disposed on the second drive shaft,
   wherein the second drive shaft is releasably coupled with the first drive shaft so that the second power generator can be removed without having to uncouple the first power generator from the engine.

16. The welding system of claim 15 wherein the first power generator comprises a welding power generator and the second power generator comprises an auxiliary power generator.

* * * * *